United States Patent [19]

Iversen

[11] Patent Number: 4,592,557

[45] Date of Patent: Jun. 3, 1986

[54] LIQUID COOLED ROTATING SEALS

[76] Inventor: Arthur H. Iversen, 15315 Sobey Rd., Saratoga, Calif. 95070

[21] Appl. No.: 699,428

[22] Filed: Feb. 7, 1985

[51] Int. Cl.$^4$ .............................................. F16J 15/54
[52] U.S. Cl. ....................................... 277/80; 277/135
[58] Field of Search ................................. 277/80, 135

[56] References Cited

U.S. PATENT DOCUMENTS

| | | | |
|---|---|---|---|
| 3,700,248 | 10/1972 | Teske et al. ............................ | 277/80 |
| 3,746,407 | 7/1973 | Stiles ...................................... | 277/80 |
| 4,514,987 | 5/1985 | Pundak et al. .......................... | 277/80 |

*Primary Examiner*—Robert I. Smith

[57] ABSTRACT

A ferrofluid rotary-shaft seal apparatus of extended seal life suitable for use as an exclusion seal in vacuum or other demanding applications which seal apparatus comprises:

(a) an annular permanent magnet adapted to surround the rotary shaft to be sealed and having poles of opposite polarity at each end; and (b) a series of spaced magnetically permeable, pole-piece elements in a magnetic-flux relationship with the one and other ends, respectively, of the permanent magnet, each pole piece having a one end and another end and adapted to surround the rotary shaft to be sealed and to form a cavity there between, the inside diameter surfaces of the stationary magnetically permeable pole piece elements comprising a plurality of spaced magnetic pole piece elements each of which acts as a separate path for magnetic flux there being ferrofluid magnetically captured between the inside diameter of each circular pole piece said ferrofluid breaching the small gap between the inside diameter of said circular pole piece and the concentrically mounted rotating magnetic shaft, there being a plurality of ferrofluid stages, sufficient to withstand needed pressure differentials.

15 Claims, 1 Drawing Figure

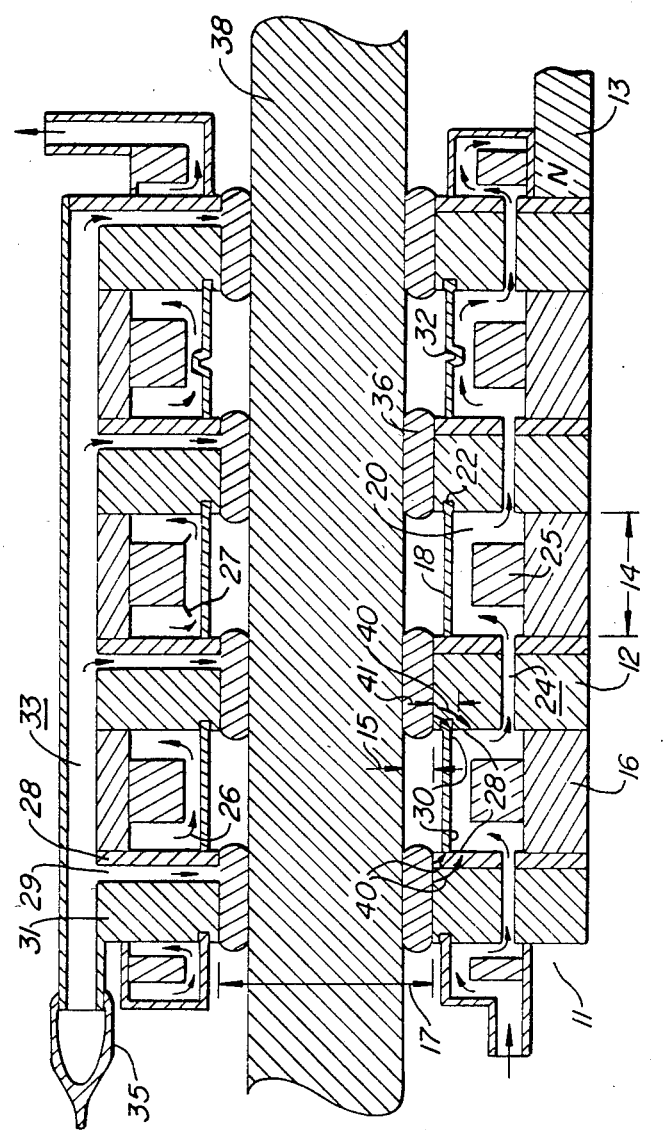
FIG.—1.

LIQUID COOLED ROTATING SEALS

TECHNICAL FIELD

The present invention relates to rotary seals suitable for maintaining pressure differentials across such seals and particularly concerns means for the efficient cooling of such seals.

BACKGROUND OF THE INVENTION

The performance and life of ferrofluid seals is strongly influenced by the operating temperature of the ferrofluid. This problem has been described by Raj et.al. in U.S. Pat. No. 4,357,021 issued 11/2/82.

"It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal."

Raj et.al. in U.S. Pat. No. 4,357,021, Raj in U.S. Pat. No. 4,357,022 issued 11/2/82, Yamamura et.al. in U.S. Pat. No. 4,340,233 issued 7/20/82 and Yamamura in U.S. Pat. No. 4,357,023 issued 11/2/82 describe means whereby heat generated in rotating ferrofluid seals may be removed. The various schemes described in the above cited patents are summerized in U.S. Pat. No. 4,357,023, column 2, line 57 through column 3, line 42.

"It has been discovered that the life of a ferrofluid rotary-seal apparatus may be extended through the proper selection of the seal housing material and housing geometry, so as to conduct heat away from the ferrofluid in one or more of the gaps of the seal. The rapid removal of heat from the ferrofluid permits a lower ferrofluid temperature during shaft operation, resulting in reduced ferrofluid loss and an extention of seal life. An extended housing may be used, which extension overlaps the top of one or more pole pieces, or where the housing extends in contact with and along one side, preferably the outside, of the pole pieces heat-conductive, heat-exchange and contacting relationship. An extended housing, wherein the extension is a sheet material and is formed by swaging or staking along the outside of one or more of the pole pieces, has been found to extend seal life, as a result of the improved thermal path for heat conduction. In one embodiment, the housing extension may be formed integrally as part of the housing or formed separately adjacent the pole pieces by cladding or adhesive techniques. The conductive extension element may extend along side the pole pieces and toward and into a close relationship with the end of the pole piece forming the gap with the surface of the rotary shaft, to hold the sealing ferrofluid, so that a thermal path extends from the area of the gap alongside the pole piece to the top or body of the housing which serves as a heat sink. It has been found, particularly with extended housings on exclusion seals used with computer-disc-drive spindles with diester ferrofluid, that a temperature reduction of 5 C or more of the ferrofluid can be obtained, permitting an extension of seal life.

In another embodiment, the heat-conductive extension can be placed on both pole pieces, to extend seal life for single-stage and multiple-stage ferrofluid seals. The extension on one pole piece extends the seal life of the ferrofluid at that particular gap, while the ferrofluid at the other gap, running at a higher temperature, is evaporated preferentially, to provide, after such stage failure or evaporation, an air gap. If desired, the housing material may be so designed to serve as a heat sink, or to designate or otherwise conduct the accumulated heat away to a heat sink of lower temperature, depending on the degree of seal life extension desired and the housing material and geometry used.

The housing and extension should be composed of a nonmagnetic material which is highly thermal-conductive. Typical useful materials include metals, such as non-magnetic stainless steel (series 300), copper, aluminum and other metals. The removal of heat is particularly helpful in extending seal life, where the ferrofluid has a high viscosity and, thus, provides more heat due to shearing forces."

For heat to reach the heat conductive housing, it must travel through the magnetic pole pieces. In general, magnetic materials have poor thermal conductivity which when combined with a relatively long thermal path results in a large temperature differential between the ferrofluid seal and the heat conductive housing. Since ferrofluids should generally be operated at 50° C. or less, a large temperature differential severely inhibits performance.

The use of heat conductive extension elements alongside the pole pieces is also proposed. This approach suffers from the shortcoming of being only suitable for one or two stage seals, i.e., external surfaces. If attempted for use in multi-stage seals, i.e., for vacuum use, the high thermal conductivity, nonmagnetic metal extension elements would interrupt the magnetic circuit, thereby compromising the seals effectiveness. Also, an undesirable temperature gradient is set up in radial direction.

SUMMARY OF THE INVENTION

The present invention provides for a liquid cooled ferrofluid seal with improved life and performance characteristics.

The present invention further provides a liquid cooled ferrofluid seal of relatively compact size.

The present invention also provides for the constant replenishment of evaporated ferrofluid.

The liquid cooling of a ferrofluid seal is described in an article by Raj titled "Testing Magnetic Fluid Seals" in the March 1979 issue of *Industrial Research/Development*. Magnetic pole pieces are shown with channels for the flow of liquid coolant. This design suffers from the shortcoming that the poor thermal conductivity of magnetic materials combined with relatively long thermal paths inherent in this design results in large temperature differentials between ferrofluid seal and the coolant. Also, this type of design generally results in a bulky structure.

A more efficient design concept is to bring the liquid coolant in close proximity to each stage of the ferrofluid seal thereby substantially reducing the temperature differential between the ferrofluid seal and the liquid cooled heat exchange surface and providing for the uniform cooling of each ferrofluid stage. The construction of the magnetic circuit design also lends itself to the reliable flow of ferrofluid to both establish a seal and to the replenishment of evaporated ferrofluid with seal life.

BRIEF DESCRIPTION OF THE DRAWINGS

FIG. 1 is a partial cross-sectional view of a rotating ferrofluid seal illustrating liquid cooling means and, means for transferring ferrofluid into the seal region.

DESCRIPTION OF THE EMBODIMENT

Referring now to FIG. 1, shown is a preferred embodiment of a liquid cooled ferrofluid seal in accordance with the present invention. Magnetic pole pieces 12 are in intimate magnetic contact with cylindrical magnetic spaces 16 and are thus spaced distance 14 apart. Magnet 13 supplies the required magnetic flux across ferrofluid seal gaps 15 between pole pieces 12 and rotating shaft 38. The magnet is shown sectioned, showing only the North pole, inasmuch that the omitted segment of the ferrofluid seal assembly which is the return magnetic path and contains the South pole, is substantially a mirror image of the segment 11 shown in FIG. 1, differing only in that it contains more or fewer ferrofluid seal stages. Thin walled cylindrical elements 18, made of a high thermal conductivity, non-magnetic material such as copper, is of a smaller diameter than spacer 16 but of larger diameter than the inside diameter 17 of pole pieces 12 such that when positioned concentrically with spacer 16, conduit 20 is defined. To precisely align copper cylinder 18, shallow circular groove 22 is provided on at least one face of each pole pieces 12.

Depth of groove 22 is such that pole pieces 12 and magnetic spacers 16 may be mated in intimate magnetic contact without interference from cylinder 18. Pole pieces 12 are provided with one or more passages 24 that join adjacent conduits 20 in series. Conduits 24 may be disposed circumferentially, the amount of magnetic material removed being no greater then that required to maintain magnetic characteristics at the desired levels, i.e., below saturation. Liquid flow diverting means 25 may be provided in each in of the conduits 20 to direct the flow 26 of liquid coolant into close proximity to the regions of maximum heat flux, that is, at pole piece faces 28 and cylinder at 30 for efficient heat removal.

Pole pieces 12, magnet cylinders 16 and non-magnetic cylinders 18 are joined hermetically and preferably vacuum tight. Methods such as brazing or welding may be used. An alternative method is to coat, such as by plating, sputtering, CVD or evaporation, parts 12 and 16 with a thin layer of a metal such as silver, copper, nickel or gold and then at a temperature somewhat less than the melting point of the applied metal, i.e., silver, copper, nickel or gold and under great pressure, the parts are fused together in a vacuum tight relationship, said pressure being supplied by a temperature differential expansion fixture or other means, the parts 12 and 16 may be hermetically sealed to each other. At the same temperature non-magnetic cylinder 18 is circumferentially brazed to pole pieces 12 forming a hermetic seal, the brazing alloy melting at the pole piece 12 and spacer 16 fusion temperature. Because non-magnetic cylinder 18 will generally have a higher coefficient of thermal expansion than magnetic cylinder 16 it may be desirable to provide an expansion joint 32 in cylinders 18 such that during the brazing operation of cylinder 18 to pole piece 12, distortion does not occur. Shown is a circular symmetric "U" joint 32 that can readily "give" to compensate for any differential expansion between magnetic cylinder 16 and non-magnetic cylinder 18 during and after the bonding, i.e., brazing operation. The dimensions of pole pieces 12 and magnetic spacers 16 are selected to meet the requirements of the magnetic circuit with regards to field strength, saturation and and leakage flux. A good choice of magnetic material would be vacuum melted iron which is characterized by high saturation magnetization and high induction. Upon completing the ferrofluid seal assembly 11 by brazing or other means, finishing machining, boring or reaming may be performed to provide the precise inside and outside diameter dimensions required.

The inside diameter 17 of pole piece 12 is smaller than the inside diameter of non-magnetic cylinder 18, the radial difference being in the range of 0.003" to 0.100". Ferrofluid seals 36 are magnetically held in close proximity to rotating shaft 38, the shaft 38 to pole piece 12 spacing 15 and other magnetic and dimensional characteristics of ferrofluid seals having been described in the previously cited Raj and Yamamura patents.

The flow of heat 40 induced by rotational shear forces in ferrofluid seal 36 travel a short distance d, 41, through pole piece 12 to reach the liquid cooled surface 28 of pole piece 12 and 30 of non-magnetic cylinder 18.

Flow diverting means 25 may be shaped 27 so as to improve liquid flow characteristics in the regions of maximum heat flux 28 for pole piece 12, 30 for non-magnetic cylinder 18.

The design principle of the present invention is best illustrated mathematically in the temperature equation $$T = To + q(d/k)$$

where T is the temperature at the ferrofluid seal, To is the temperature of the liquid cooled heat exchange surface, q is the heat flux, d is the distance from the ferrofluid seal to the liquid coolant heat exchange surfaces and, k is the thermal conductivity.

In general, magnetic metals such as are used in ferrofluid magnetic structure have low thermal conductivity, thus giving rise to large temperatures T at the ferrofluid seal. However, if the heat flux path length d can be made small, this can largely offset the poor thermal conductivity k as it is the ratio d/k that is crucial. Thus, a low temperature T may be obtained. A further benefit of liquid cooling in the proximity of the ferrofluid seal is obtained by the use of nucleate boiling of the liquid cooling by use of refrigerate liquids, such as fluorocarbons, that boil at temperatures close to ambient temperatures. Nucleate boiling is the most efficient liquid cooling technique known. Nucleate boiling offers the additional advantage, should it be needed, of providing a constant temperature heat exchange surface, the fixed temperature being the boiling temperature of the liquids. Thus, the temperature T of the ferrofluid seal may be optimized for best operating characteristics by selecting the boiling temperature To of the liquid and designing the length d of the heat flux path such that at the specified heat flux q and thermal conductivity k desired temperature gradients are established resulting in optimum ferrofluid seal performance and desired life.

A further benefit of the present invention lies in its ability to provide a simple and positive means whereby ferrofluid may be introduced to the ferrofluid seal region. It also provides means whereby the ferrofluid at the seal that is evaporated with life may be readily replenished, thus maintaining seal integrity for longer periods of time.

The above is accomplished by providing pole piece 12 with a radial conduit 29 extending down to and opening into the ferrofluid seal 36. Conduit 29 is of relatively small dimensions, such as 0.015"×0.015", such that the specified ferrofluid flow is unimpeded while retaining desired magnetic properties at the ferrofluid seal, that is, that there be no substantial weakening of the magnetic field across the ferrofluid seal gap 15 at conduit 29 due to magnetic saturation. To obtain conduit 29 in pole piece 12, pole piece 12 may be fabricated from 2 parts, 31 and 28, one part being preferably thicker than the other. According to the Raj patents, pole piece 12 may range in thickness from 0.025" to 0.080". If a thickness of 0.060" is selected then part 28 may be, for example, 0.015" thick and thick part 31 is then 0.045", the surfaces of both parts being precisely ground smooth and parallel. A radial slot 29, about 0.015"×0.015", is cut in part 31. Parts 31 and 28 are then joined by brazing, welding, adhesives etc. or, as previously described, are plated with a metal such as nickel, copper, silver or gold. The plating thickness is only sufficiently thick such that under high pressure and temperature a hermetic bond is obtained between each set of parts 31 and 28. Thin part 28 covers radial slot 29 in thick part 31. In this manner, conduit 29 is formed. It should be noted that the plating thicknesses are so thin, typically a few microns, that the magnetic characteristics of the assembled pole piece 12 are not significantly affected. Use of a magnetic material such as nickel to obtain the bond further minimizes any effect on the magnetic characteristics of pole piece 12. To feed the radial ferrofluid conduits 29 in each of pole pieces 12, which are shown lined up, axial ferrofluid conduit 33 of suitable cross-section may be provided. Pressure providing means such as expanded and sealed elastomer tubing 35 may be attached to conduit 33 to insure the flow of ferrofluid down conduit 29 to establish and thereafter replenish ferrofluid seal 36.

A further advantageous embodiment of the present invention is in combination with U.S. patent application Ser. No. 536,864 filed by A. Iversen on Sept. 29, 1983 and herein incorporated by reference. Iversen describes a high vacuum ferrofluid rotating seal structure wherein independent vacuum pumping means are incorporated in the region of the permanent magnet intermediate between the atmospheric side and the high vacuum side whereby the vacuum chamber is protected from gas intrusion, such as by ferrofluid seal bursts, by a buffer vacuum provided by said independent vacuum pumping means. Iversen further describes the introduction of the ferrofluid into the rotating seal region after the high temperature processing of the tube. Conduits 33 and 29 of the present invention provide the means whereby said ferrofluid may be introduced to the rotating seal region after high temperature tube processing.

What is claimed is:
1. A ferrofluid, rotary-seal apparatus comprising:
   (a) an annular permanent magnet adapted to surround the rotary shaft to be sealed and having poles of opposite polarity at each end; and
   (b) a series of spaced, magnetically permeable, pole-piece elements in a magnetic-flux relationship with the one and other ends, respectively, of the permanent magnet, each pole piece having a one end and another end and adapted to surround the rotary shaft to be sealed and to form a cavity there between, the inside diameter surfaces of the stationary magnetically permeable pole piece elements comprising a plurality of spaced magnetic pole piece elements each of which acts as a separate path for magnetic flux there being ferrofluid magnetically captured between the inside diameter of each circular pole piece said ferrofluid breaching the small gap between the inside diameter of said circular pole piece and the concentrically mounted rotating magnetic shaft, there being a plurality of ferrofluid stages, sufficient to withstand needed pressure differentials, the improvement wherein:
   means are provided to establish a conduit for the flow of liquid coolant in close proximity to said ferrofluid seal, said conduit being established between said magnetic pole pieces and, said conduit having at least one wall of non-magnetic material, said non-magnetic wall being joined to said magnetic pole pieces in close proximity to said ferrofluid seals, said magnetic pole pieces having axial passages thereby joining adjacent conduits wherein said liquid coolant may flow through assembly of pole pieces and conduits.

2. In the apparatus of claim 1, the further improvement wherein liquid flow diverting means are incorporated into said conduit whereby efficient cooling of said pole piece and said non-magnetic wall is obtained.

3. A ferrofluid, rotary-seal apparatus comprising:
   (a) an annular permanent magnet adapted to surround the rotary shaft to be sealed and having poles of opposite polarity at each end; and
   (b) a series of spaced, magnetically permeable, pole-piece elements in a magnetic-flux relationship with the one and other ends, respectively, of the permanent magnet, each pole piece having a one end and another end and adapted to surround the rotary shaft to be sealed and to form a cavity there between, the inside diameter surfaces of the stationary magnetically permeable pole piece elements comprising a plurality of spaced magnetic pole piece elements each of which acts as a separate path for magnetic flux there being ferrofluid magnetically captured between the inside diameter of each circular pole piece said ferrofluid breaching the small gap between the inside diameter of said circular pole piece and the concentrically mounted rotating magnetic shaft, there being a plurality of ferrofluid stages, sufficient to withstand needed pressure differentials, the improvement wherein:
   one or more radial conduits are provided within each said magnetic pole piece extending to and opening into each ferrofluid seal region wherein ferrofluid may be introduced to initiate a seal and to provide replenishment with life, said conduits being of such dimensions that the magnetic characteristics of said pole pieces are not adversely affected.

4. In the apparatus of claim 3 the improvement wherein said pole pieces comprise two circular segments, one preferably thicker than the other, the thicker segment having a radial slot, said thinner pole piece being hermetically bonded to the thicker segment and covering said slot whereby a conduit is formed for the flow of said ferrofluid to the ferrofluid seal region.

5. In the apparatus of claim 4 the improvement wherein said magnetic pole pieces are joined by fusion bonding wherein a thin layer of material is deposited on said pole pieces surfaces and said assembled segments then being bonded under great pressure and high temperature, said temperature being generally less than the melting point of said applied material whereby a seal is effected and the magnetic characteristics of said magnetic pole piece remain substantially uneffected.

6. In the apparatus of claim 1 the improvement wherein said structure comprises alternately circular symmetric magnetic pole pieces and cylindrical magnetic spacers at the periphery and, thin walled cylindrical non-magnetic elements of smaller diameter then said cylindrical magnetic spaces, said cylindrical non-magnetic elements being positioned concentrically within said magnetic spacers thereby forming a chamber there between, said pole pieces having axial conduits, thus providing for liquid flow between chambers, said pole pieces, magnetic spaces and non-magnetic cylinders being bonded by means such as. brazing, high temperature and pressure fusion or adhesives.

7. In the apparatus of claim 6 the improvement wherein said chamber is provided with liquid flow diverting means whereby more efficient heat transfer is obtained.

8. In the apparatus of claim 3 the improvement wherein said ferrofluid conduits join a common conduit, said common conduit serving as a resevoir of and passage for ferrofluid for said multiple ferrofluid conduits.

9. In the apparatus of claim 8 the improvement wherein common conduit is provided with pressurization means wherein said ferrofluid is aided in its flow to initially fill the ferrofluid seal and thereafter to provide replenishment with life.

10. In the apparatus of claim 1 the improvement wherein the first and second magnetically permeable pole pieces, in the region of the permanent magnet, are hermetically sealed and a vacuum pump affixed with a evacuating path provided through the permanent magnet to the region of the rotating shaft whereby a vacuum may be maintained in said region defined by the permanentmagnet and abutting magnetically permeable pole pieces.

11. In the apparatus of claim 6 the improvement wherein the first and second magnetically permeable pole pieces, in the region of the permanent magnet, are hermetically sealed and a vacuum pump affixed with a evacuating path provided through the permanent magnet to the region of the rotating shaft whereby a vacuum may be maintained in said region defined by the permanent magnet and abutting magnetically permeable pole pieces.

12. In the apparatus of claim 3 the improvement wherein the first and second magnetically permeable pole pieces, in the region of the permanent magnet, are hermetically sealed and a vacuum pump affixed with a evacuating path provided through the permanent magnet to the region of the rotating shaft whereby a vacuum may be maintained in said region defined by the permanent magnet and abutting magnetically permeable pole pieces.

13. Apparatus as described in claim 1 wherein said vacuum pump connected to said permanent magnet region is further provided with vacuum tight tubing and valving that connects it with the main vacuum chamber whereby said vacuum pump may be used to maintain all evacuated segments of the system at high vacuum during shipment or storage.

14. Apparatus as described in claim 6 wherein said vacuum pump connected to said permanent magnet region is further provided with vacuum tight tubing and valving that connects it with the main vacuum chamber whereby said vacuum pump may be used to maintain all evacuated segments of the system at high vacuum during shipment or storage.

15. Apparatus as described in claim 3 wherein said vacuum pump connected to said permanent magnet region is further provided with vacuum tight tubing and valving that connects it with the main vacuum chamber whereby said vacuum pump may be used to maintain all evacuated segments of the system at high vacuum during shipment or storage.

* * * * *